United States Patent
Park et al.

(10) Patent No.: US 8,401,031 B2
(45) Date of Patent: Mar. 19, 2013

(54) METHOD OF PERFORMING RANDOM ACCESS PROCEDURE IN WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 12/374,842

(22) PCT Filed: Feb. 5, 2008

(86) PCT No.: PCT/KR2008/000723
§ 371 (c)(1),
(2), (4) Date: Jan. 23, 2009

(87) PCT Pub. No.: WO2008/097023
PCT Pub. Date: Aug. 14, 2008

(65) Prior Publication Data
US 2010/0002590 A1    Jan. 7, 2010

(30) Foreign Application Priority Data
Feb. 6, 2007    (KR) .................... 10-2007-0012064

(51) Int. Cl.
*H04L 12/413* (2006.01)
(52) U.S. Cl. .................................................. 370/431
(58) Field of Classification Search .......... None
See application file for complete search history.

(56) References Cited

U.S. PATENT DOCUMENTS

| | | | |
|---|---|---|---|
| 6,917,602 B2 * | 7/2005 | Toskala et al. ........... | 370/335 |
| 2004/0038713 A1 | 2/2004 | Okawa et al. | |
| 2006/0268772 A1 | 11/2006 | Ko et al. | |
| 2007/0153733 A1 * | 7/2007 | Kim et al. ................ | 370/329 |
| 2007/0230600 A1 * | 10/2007 | Bertrand et al. ........... | 375/260 |
| 2008/0273610 A1 * | 11/2008 | Malladi et al. ............ | 375/260 |
| 2010/0093386 A1 * | 4/2010 | Damnjanovic et al. ..... | 455/522 |
| 2010/0189071 A1 * | 7/2010 | Kitazoe .................... | 370/331 |
| 2010/0260140 A1 * | 10/2010 | Zhu ......................... | 370/331 |
| 2012/0140664 A1 * | 6/2012 | Walton et al. ............. | 370/252 |

FOREIGN PATENT DOCUMENTS
KR    10-2004-0018217 A    3/2004

* cited by examiner

*Primary Examiner* — Kevin C Harper
*Assistant Examiner* — Samina Choudhry
(74) *Attorney, Agent, or Firm* — Birch, Stewart, Kolasch & Birch, LLP

(57) ABSTRACT

A method of performing a random access procedure in a wireless communication system is provided. The method includes transmitting a random access preamble, and monitoring a downlink control channel in a transmission time interval (TTI) window for a random access response, the TTI window comprising a plurality of TTIs, wherein a TTI is an interval to search a random access-radio network temporary identity (RA-RNTI) transmitted on the downlink control channel and monitoring the downlink control channel for the random access response is stopped when the random access response including an random access preamble identifier corresponding to the transmitted random access preamble is received.

17 Claims, 14 Drawing Sheets

METHOD OF PERFORMING RANDOM ACCESS PROCEDURE IN WIRELESS COMMUNICATION SYSTEM

FIELD OF THE INVENTION

The present invention relates to wireless communication, and more particularly, to a method of performing a random access procedure that reduces power consumption of a user equipment in a wireless communication system.

BACKGROUND ART

Third generation partnership project (3GPP) mobile communication systems based on a wideband code division multiple access (WCDMA) radio access technique are widely spread all over the world. High-speed downlink packet access (HSDPA) that can be defined as a first evolutionary stage of WCDMA provides 3GPP with a wireless access technique that is highly competitive in the mid-term future. However, since requirements and expectation of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment, and the like are defined as requirements.

There are one or more cells within the coverage of a base station. A plurality of user equipments can be placed within a cell. Generally, a user equipment performs a random access procedure to access to a network. The random access procedure is used for a variety of purposes, such as for synchronizing between the user equipment and the network or obtaining uplink radio resources for the user equipment.

Since battery capacity of a user equipment is limited, reducing power consumption of the user equipment is one of major technical issues. The random access procedure may be frequently performed to accomplish the variety of purposes. If power consumption of a user equipment is minimized during the random access procedure, the user equipment can be used for a longer time. A method is sought for performing a random access procedure that reduces power consumption of a user equipment.

SUMMARY OF THE INVENTION

A method for performing a random access procedure that reduces power consumption of a user equipment is provided.

In an aspect, a method of performing a random access procedure in a wireless communication system is provided. The method includes transmitting a random access preamble, and monitoring a downlink control channel in a transmission time interval (TTI) window for a random access response, the TTI window comprising a plurality of TTIs, wherein a TTI is an interval to search a random access-radio network temporary identity (RA-RNTI) transmitted on the downlink control channel and monitoring the downlink control channel for the random access response is stopped when the random access response including an random access preamble identifier corresponding to the transmitted random access preamble is received.

In another aspect, a method of performing a random access procedure in a wireless communication system is provided. The method includes transmitting a random access preamble, and monitoring a downlink control channel in a TTI window for a random access response, the TTI window comprising a plurality of TTIs, wherein a TTI is an interval to monitor the downlink control channel and monitoring for the random access response is stopped when the random access response including an random access preamble identifier corresponding to the transmitted random access preamble is received.

In still another aspect, a wireless device includes a RF (Radio Frequency) unit for transmitting radio signals, and a processor coupled to the RF unit, and configured to transmit a random access preamble and monitor a downlink control channel in a TTI window for a random access response, the TTI window comprising a plurality of TTIs, wherein a TTI is an interval to monitor the downlink control channel and monitoring the downlink control channel for the random access response is stopped when the random access response including an random access preamble identifier corresponding to the transmitted random access preamble is received.

In still another aspect, a method of performing a random access procedure in a mobile communication system. The method includes transmitting a random access preamble to a network, configuring a first time interval to receive a plurality of random access responses from the network, wherein the first time interval comprises a plurality of second time intervals and each random access response is related to each corresponding second time interval, and monitoring a downlink control channel in the first time interval to receive a random access response from the network, wherein if the random access response is successfully received in a second time interval that is ahead of other second time intervals, monitoring the downlink control channel is stopped after the second time interval.

ADVANTAGEOUS EFFECTS

In random access procedure, a user equipment transmits a random access preamble and then monitors a control channel within a time interval to receive a random access response. The user equipment stops to monitor the control channel after confirming its random access response within the time interval. Power consumption of the user equipment can be reduced.

DESCRIPTION OF EMBODIMENTS OF THE INVENTION

Figure 1:
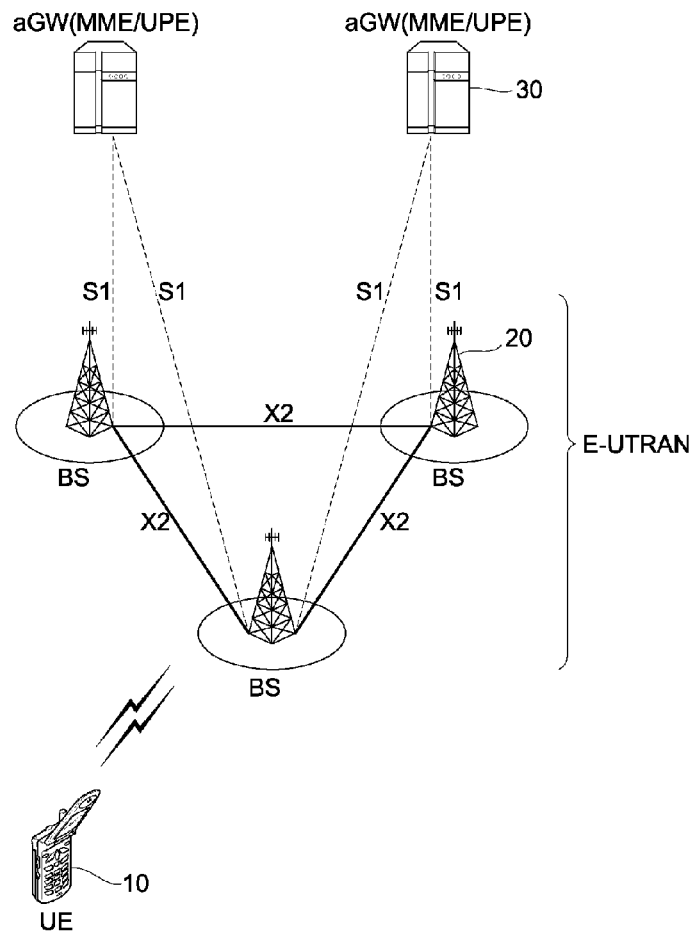
FIG. 1 is a block diagram showing a wireless communication system.

FIG. 1 is a block diagram showing a wireless communication system. This may be a network structure of an E-UMTS (Evolved-Universal Mobile telecommunications System). The E-UMTS system may be referred to as an LTE (Long-term Evolution) system. The wireless communication system can widely be deployed to provide a variety of communication services, such as voices, packet data, and the like.

Referring to FIG. 1, an E-UTRAN (Evolved-UMTS Terrestrial Radio Access Network) includes base stations (BS) 20. A user equipment 10 can be fixed or mobile and can be referred to as another terminology, such as a MS (Mobile Station), a UT (User Terminal), a SS (Subscriber Station), wireless device, or the like. The base station 20 generally is a fixed station that communicates with the user equipment 10 and can be referred to as another terminology, such as an e-NB (evolved-NodeB), BTS (Base Transceiver System), access point, or the like. There may be one or more cells within the coverage of the base station 20. An interface for transmitting user traffic or control traffic can be used between base stations 20. Hereinafter, downlink means a communication from the base station 20 to the user equipment 10, and uplink means a communication from the user equipment 10 and the base station 20.

The base station 20 provides the user equipment 10 with termination points of a user plane and a control plane. The base stations 20 can be connected with each other through an X2 interface, and adjacent base stations 20 can have a network of a meshed structure where the X2 interface always exists.

The base station 20 is connected to an EPC (Evolved Packet Core), further specifically, to an aGW (access Gateway) 30 through an S1 interface. The aGW 30 provides a termination point of session and mobility management function of the user equipment 10. A plurality of nodes of the base stations 20 and the aGWs 30 can be connected to each other in a many-to-many relation through the S1 interface. The aGW 30 can be divided into a part for processing user traffic and a part for processing control traffic. In this case, the part for processing user traffic of a new user and the part for processing control traffic can communicate with each other through a new interface. The aGW 30 also can be referred to as an MME/UPE (Mobility Management Entity/User Plane Entity).

Figure 2:
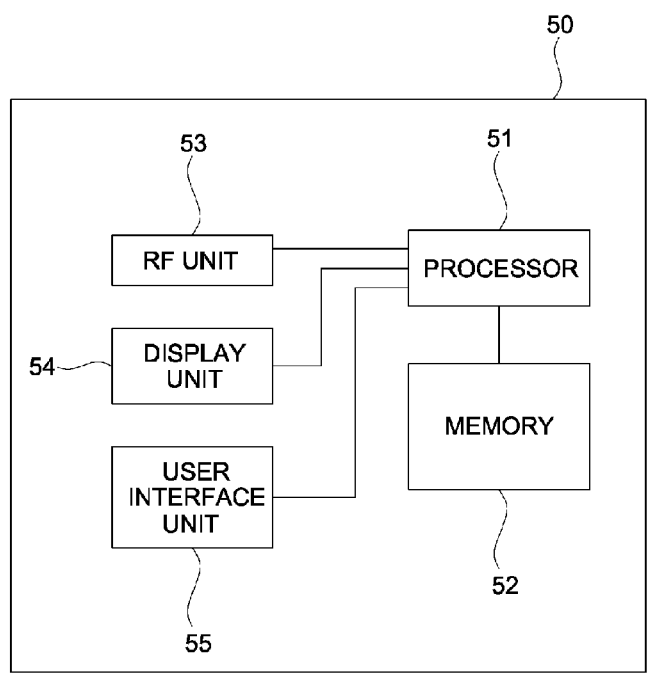
FIG. 2 is a block diagram showing constitutional elements of a user equipment.

FIG. 2 is a block diagram showing constitutional elements of a user equipment. A user equipment 50 includes a processor 51, memory 52, an RF unit 53, a display unit 54, and a user interface unit 55. The memory 52 coupled with the processor 51 stores operating systems, applications, and general files. The display unit 54 displays a variety of information on the user equipment and may use a well-known element, such as an LCD (Liquid Crystal Display), OLED (Organic Light Emitting Diode), or the like. The user interface unit 55 can be configured with a combination of well-known user interfaces such as a keypad, touch screen, and the like. The RF unit 53 coupled to the processor 53 transmits and/or receives radio signals.

Functions of layers of the radio interface protocol can be implemented in the processor 51. The processor 51 can provide control plane and user plane.

Layers of the radio interface protocol between the user equipment and the base station can be classified into L1 (a first layer), L2 (a second layer), and L3 (a third layer) based on the lower three layers of the Open System Interconnection (OSI) model that is well-known to communication systems. The physical layer belonging to the first layer provides information transfer service using a physical channel. A radio resource control (RCC) layer belonging to the third layer serves to control radio resources between the user equipment and the network. The user equipment and the network exchange RRC messages via the RRC layer. The RRC layer can be distributed among network nodes, such as the base station, the aGW, and the like. Or, the RRC layer can be located only in the base station or the aGW.

The radio interface protocol includes a physical layer, a data link layer, and a network layer in horizontal plane, and user plane for transmitting user data and control plane for transferring control signals in vertical plane.

Figure 3:
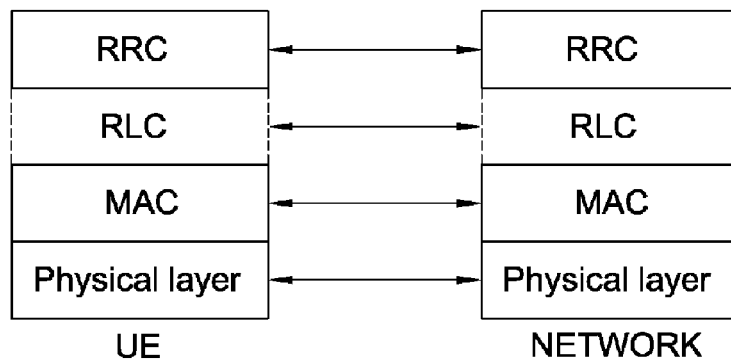
FIG. 3 is a block diagram showing the control plane of a radio interface protocol.
Figure 4:
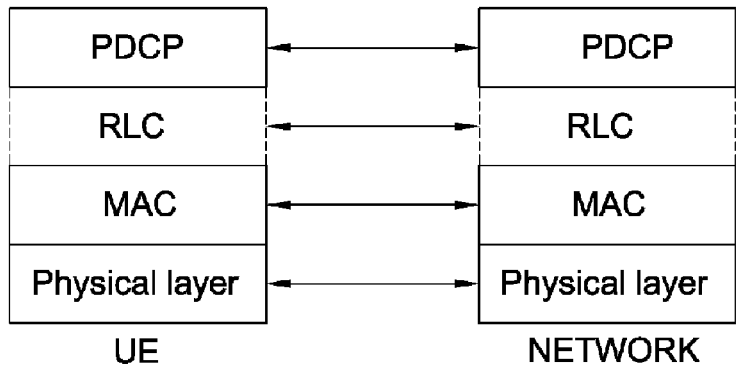
FIG. 4 is a block diagram showing the user plane of a radio interface protocol.

FIG. 3 is a block diagram showing control plane of the radio interface protocol. FIG. 4 is a block diagram showing user plane of the radio interface protocol. FIGS. 3 and 4 show the structure of the radio interface protocol between the user equipment and the E-UTRAN based on the 3GPP radio access network specification.

Referring to FIGS. 3 and 4, a physical layer, i.e., the first layer, provides an information transfer service to upper layers through a physical channel. The physical layer is connected to the MAC (Medium Access Control) layer, i.e., an upper layer of the physical layer, through a transport channel. Data are transferred between the MAC layer and the physical layer through the transport channel. Between different physical layers, i.e., the physical layer of a transmitter and the physical layer of a receiver, data are transferred through the physical channel.

The MAC layer provides a service to a RLC (Radio Link Control) layer, i.e., an upper layer of the MAC layer, through a logical channel. The RLC layer in the second layer supports reliable data transmissions. The functions of the RLC layer can be implemented as a functional block within the MAC layer, and in this case, the RLC layer may not exist as shown in dotted line.

A PDCP (Packet Data Convergence Protocol) belonging to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A RRC (Radio Resource Control) layer belonging to the third layer is defined only on the control plane. The RRC layer serves to control the logical channel, the transport channel, and the physical channel in association with configuration, reconfiguration, and release of Radio Bearers (RBs). The RB is a service provided by the second layer for data transmission between the user equipment and the E-UTRAN.

A downlink transport channel includes a BCH (Broadcast Channel) for transmitting system information and a DL-SCH (Downlink-Shared Channel) for transmitting user traffic or control messages. Multicast traffic, broadcast traffic and control messages can be transmitted through the DL-SCH or a separate DL-MCH (Downlink-Multicast Channel). An uplink transport channel includes a RACH (Random Access Channel) for transmitting an initial control message and an UL-SCH (Uplink-Shared Channel) for transmitting user traffic or control messages.

Hereinafter, random access procedure is described. The random access procedure is performed to synchronize between a user equipment and a network or to obtain for the user equipment uplink radio resources.

For example, a user equipment is going to initially access to a cell after power is turned on. First, the user equipment synchronizes for a downlink and receives system information of the cell. Then, the user equipment synchronizes for an uplink through the random access procedure and requests radio resources for transmitting a connection request message. The user equipment transmits the connection request message to the network using the radio resources.

For another example, it is assumed that a user equipment has an RRC connection with a base station. The base station schedules allocation of radio resource for the user equipment. When there are no more uplink data, the buffer of the user equipment is empty and the base station does not allocate uplink radio resources. It is inefficient to allocate uplink radio resources to the user equipment that does not use the uplink radio resources. The buffer status of the user equipment is reported to the network periodically or non-periodically. When new data is arrived in the buffer of the user equipment that does not have allocated uplink radio resources, the user equipment obtains new uplink radio resources through the random access procedure.

Hereinafter, a RACH (random access channel) of the WCDMA (wideband code division multiple access) is described. The RACH is used to transmit short uplink data. Some RRC messages, such as an RRC connection request message, cell update message, URA update message, and the like, are transmitted through the RACH. A logical channel, such as a CCCH (Common Control Channel), DCCH (Dedicated Control Channel), or DTCH (Dedicated Traffic Channel), can be mapped to the RACH which is a transport channel, and the RACH is mapped to a PRACH (Physical Random Access Channel).

Figure 5:
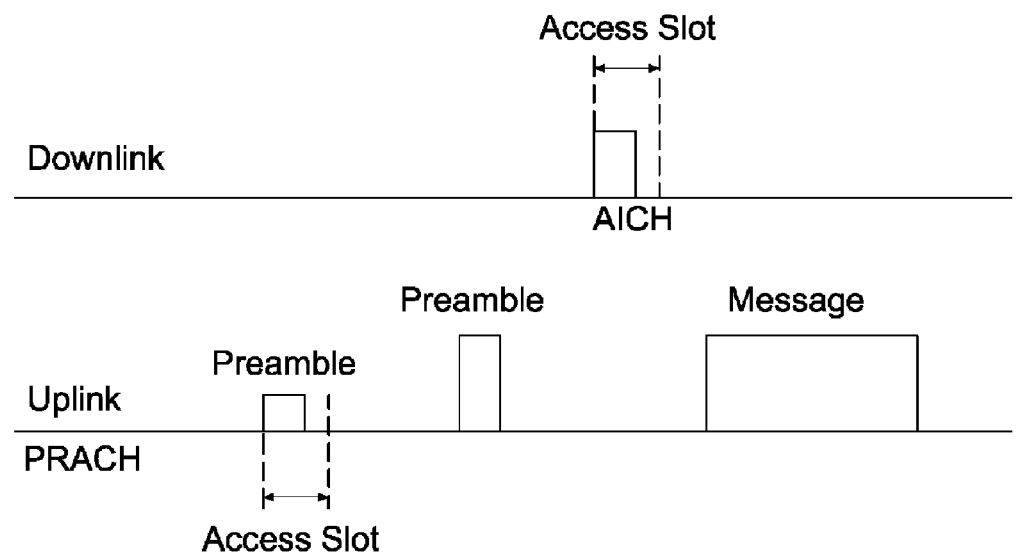
FIG. 5 is a view showing an example of using a RACH.

FIG. 5 is a view showing an example of using a RACH.

Referring to FIG. 5, a PRACH transmits a preamble part and/or a message part. The preamble part performs power ramping function for controlling appropriate transmission power and function for preventing collision with other user equipments. The message part performs function for transmitting a MAC PDU (Protocol Data Unit).

The physical layer first selects an access slot and a preamble and then transmits the preamble through the PRACH. The preamble can be transmitted for an access slot period of 1.33 ms. A user equipment may randomly select and transmit a preamble among a set of 16 preambles.

A base station that receives the preamble transmitted by the user equipment transmits a random access response through a downlink physical channel AICH (Acquisition Indicator Channel). The base station transmits the random access response through the AICH for a certain period from the start of an access slot corresponding to the access slot through which the preamble is transmitted. The base station transmits an Acknowledgement (ACK) or a Negative Acknowledgement (NACK) to the user equipment through the AICH. If the user equipment receives the ACK, the user equipment transmits the message part of 10 ms or 20 ms long using an OVSF (Orthogonal Variable Spreading Factor) corresponding to the transmitted preamble. If the user equipment receives the NACK, the MAC layer of the user equipment directs the physical layer to transmit another preamble after a certain period of time. If the user equipment does not receive a response message, the user equipment transmits a new preamble with power a step higher than that of the previous preamble after a predetermined number of access slots.

Figure 6:
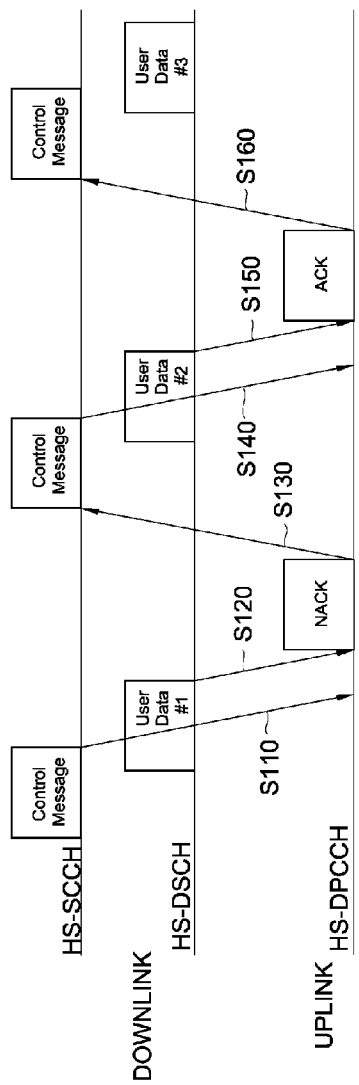
FIG. 6 is a view showing a HARQ method.

FIG. 6 is a view showing a HARQ (Hybrid Automatic Repeat Request) method. This is a HARQ method of WCDMA. It shows a specific implementation method of the HARQ method in a downlink physical layer of a radio packet communication system.

Referring to FIG. 6, a base station transmits a control message to a user equipment through a downlink control channel S110. The base station transmits user data to the user equipment through a downlink shared channel S120. The downlink control channel may be a High Speed-Shared Control Channel (HS-SCCH) and the downlink shared channel may be a High Speed-Downlink Shared Channel (HS-DSCH). The control message includes information on the user equipment that is to receive a packet and information on the format of the user data (code rate, modulation scheme, data amount, and the like). After receiving the control message on the HS-SCCH, the user equipment can know the format and transmission of the user data.

When the user equipment fails to decode the user data, the user equipment transmits a NACK signal to the base station S130. The NACK signal can be transmitted through a High Speed-Dedicated Physical Control Channel (HS-DPCCH). The base station receiving the NACK signal identifies failure of transmitting the user data. The base station retransmits the user data and the control message for the user data S140 and S150. The user equipment may retry decoding the user data by combining the retransmitted data with the data previously received.

If the user equipment succeeds to decode the user data, the user equipment transmits an ACK signal to the base station S160. The ACK signal can be transmitted through the HS-DPCCH. The base station receiving the ACK signal identifies success of transmitting the user data and performs transmitting next user data.

Figure 7:
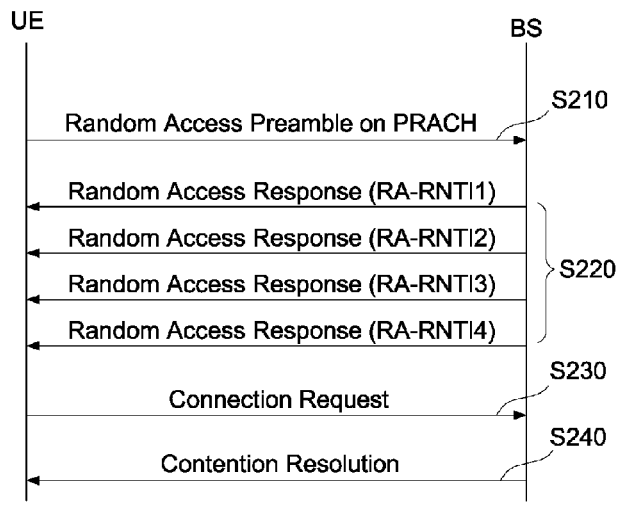
FIG. 7 is a flowchart illustrating a random access procedure according to an embodiment of the present invention.

FIG. 7 is a flowchart illustrating a random access procedure according to an embodiment of the present invention.

Referring to FIG. 7, a user equipment transmits a random access preamble to a base station through a PRACH at step S210. The user equipment obtains a set of available random access preambles through system information or a paging message received from the base station and selects a random access preamble from the set of random access preambles. The random access preamble may contain cause information for performing random access. The cause information is information on a cause of the user equipment for requesting random access to the network. The system information or paging information contains information on a random access preamble identifier used for each cause. The random access preamble identifier is an identifier for identifying a random access response and will be hereinafter referred to as an RA-RNTI (Random Access-Radio Network Temporary Identity).

The causes of the user equipment for performing random access to the base station may include 1) initial access, 2) handover, 3) scheduling request, 4) time synchronization, and the like. These are only examples, and the number or contents of causes for performing random access may vary depending on a system. The base station informs the user equipment of information on RA-RNTIs used for respective causes through system information or paging information. For example, RA-RNTI1 is used if the cause is initial access, RA-RNTI2 if handover, RA-RNTI3 if radio resource request, and RA-RNTI4 if time synchronization. It is not that only one RA-RNTI is transmitted through a downlink control channel, but that a plurality of RA-RNTIs is transmitted depending on respective causes. The downlink control channel is a control channel dedicated to a downlink, which is referred to as a PDCCH (Physical Dedicated Control Channel).

After receiving the random access preamble, the base station transmits a random access response to the user equipment at step S220. The random access response on DL-SCH is addressed to the RN-RNTI on PDCCH. The user equipment monitors the PDCCH and receives four RA-RNTIs (RA-RNTI1, RA-RNTI2, RA-RNTI3, and RA-RNTI4). The user equipment reads a random access response on a DL-SCH addressed by the RA-RNTIs. The random access response may include a timing alignment value for adjusting uplink timing, information on allocation of uplink radio resources for transmitting a connection request message, and a temporary C-RNTI (Cell-Radio Network Temporary Identity). In addition, the random access response includes information on a random access preamble identifier corresponding to the random access preamble so that the user equipment may identify its random access response. The base station determines cause information of the random access based on the random access preamble selected by the user equipment or PRACH resources. For example, if there are four random access causes, four types of random access responses are generated.

Although four random access responses are shown in the figure, the number of the random access responses is not limited thereto, but can be one or more. For example, when only one user equipment transmits a random access preamble for initial access at a specific time or within a specific time interval, the base station may transmit only one random access response together with RA-RNTI1. Or, when a plurality of user equipments transmits a plurality of random access preambles, the base station may transmit a plurality of random access responses.

The user equipment transmits a connection request message through the radio resources contained in the random access response at step S230. The user equipment transmits a connection request message based on the information included in the random access response.

After receiving the connection request message from the user equipment, the base station transmits a contention resolution message to the user equipment at step S240.

The user equipment transmits a new random access preamble when no random access response is received from the base station or all received random access responses contain random access preamble identifiers that do not match the transmitted random access preamble.

It is assumed that a base station transmits a plurality of random access responses in response to random access preambles received from user equipments. For example, when three user equipments A, B, and C respectively transmit random access preambles, the base station transmits random access responses to the three user equipments. Each of the user equipment receives a random access response on DL-SCH addressed by an RA-RNTI on a PDCCH and confirms its random access response by determining whether the random access random access preamble identifier contained in the random access response corresponds to its random access preamble. That is, the user equipment that has transmitted a random access preamble confirms an RA-RNTI transmitted through a PDCCH and reads a random access response on a corresponding DL-SCH. The user equipment transmits a new random access preamble when no random access response is received within a predetermined time period.

Figure 8:
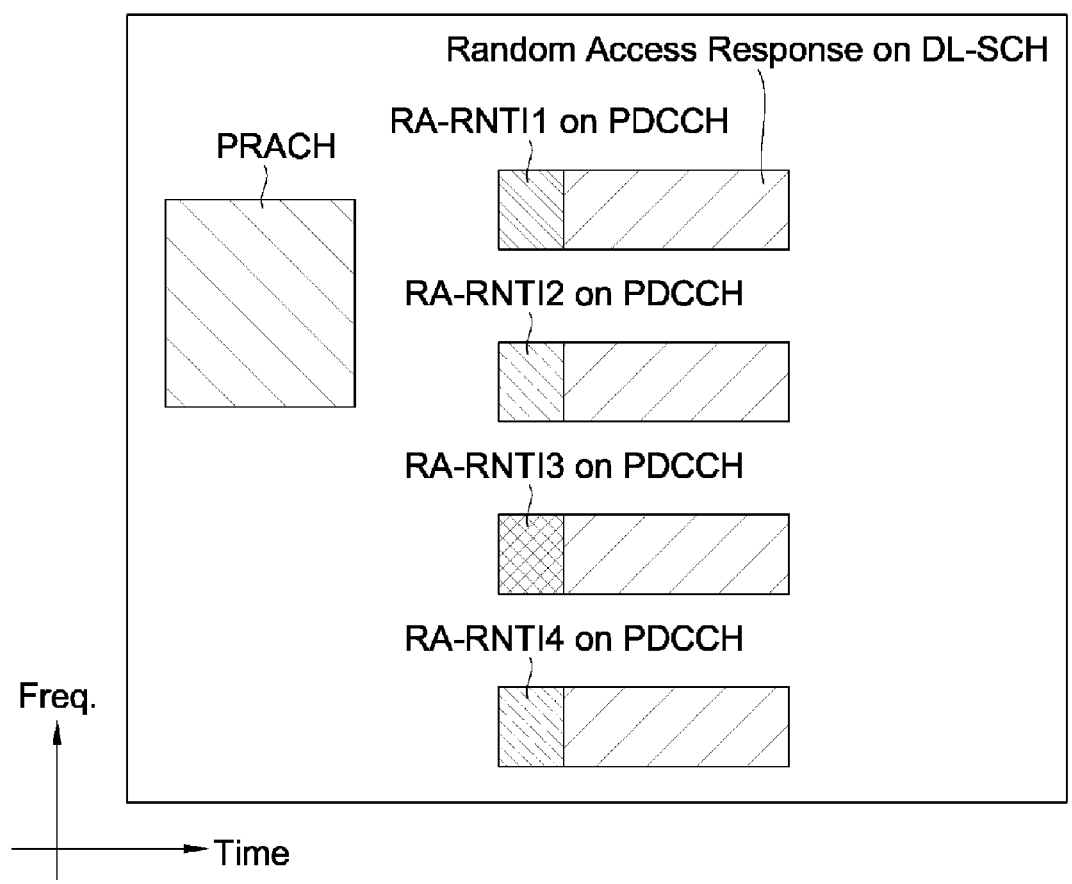
FIG. 8 is a view showing an example of a method of transferring the random access response of FIG. 7.

FIG. 8 is a view showing an example of a method of transferring the random access response of FIG. 7.

Referring to FIG. 8, a user equipment transmits a random access preamble to a base station through a PRACH. The base station transmits four random access responses using four different RA-RNTIs through a DL-SCH. The random access responses having different RA-RNTIs are transmitted through FDD (Frequency Division Duplex). That is, frequencies of the DL-SCH and the PDCCH for transmitting the RA-RNTIs are divided to transmit the random access responses.

Figure 9:
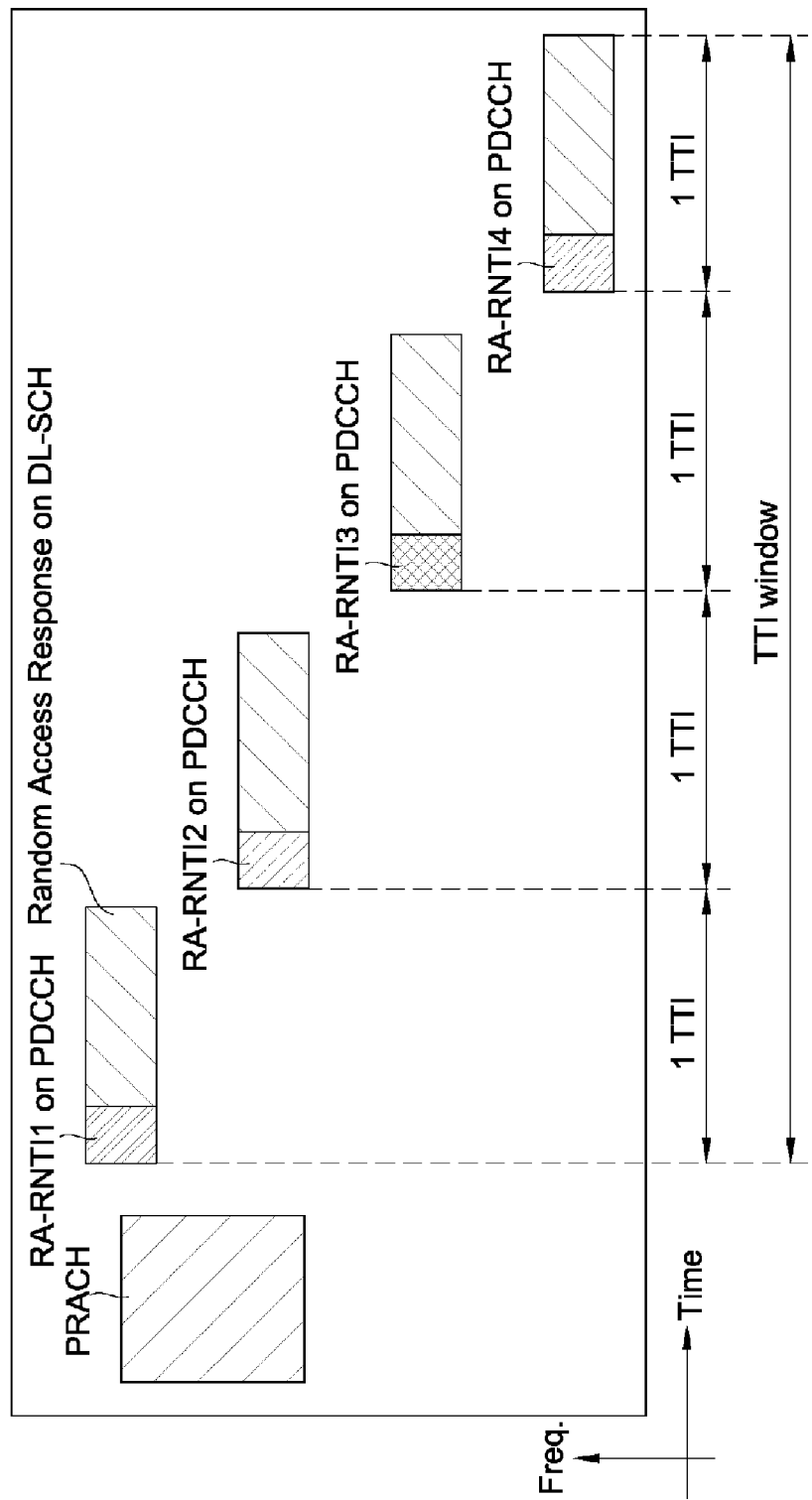
FIG. 9 is a view showing another example of a method of transferring a random access response of FIG. 7.

FIG. 9 is a view showing another example of a method of transferring a random access response of FIG. 7.

Referring to FIG. 9, a user equipment transmits a random access preamble to a base station through a PRACH. The base station transmits four random access responses using four RA-RNTIs through a DL-SCH. The random access responses are transmitted in TDD (Time Division Duplex). The DL-SCH and the PDCCH are divided in time to sequentially transmit respective random access responses. It is assumed that a TTI (Transmission Time Interval) is an interval to search a random access response transmitted in time division. The TTI is an interval to search the RA-RNTI transmitted on the downlink control channel, or the TTI is an interval to monitor the downlink control channel. A TTI window is an interval of a user equipment to wait for its random access response. The TTI window comprises a plurality of TTIs. The user equipment transmits a new random access preamble when no random access response is received within the TTI window. The user equipment stops monitoring for the random access response when the random access response including a random access preamble identifier corresponding to the random access preamble is received. For example, if the user equipment confirms a random access response addressed by RA-RNTI1 as its random access response, the user equipment stops monitoring for random access responses in subsequent TTIs. Therefore, power consumption of the user equipment caused by continuously monitoring a PDCCH during the TTI window can be reduced.

Figure 10:
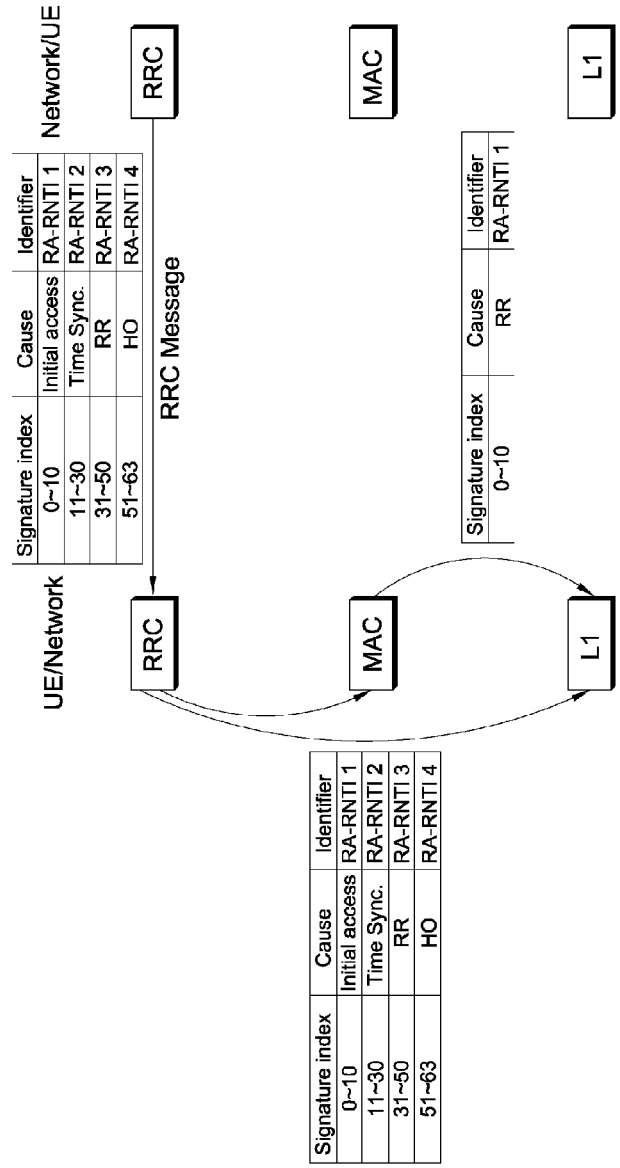
FIG. 10 is a block diagram showing a random access procedure according to an embodiment of the present invention.

FIG. 10 is a block diagram showing a random access procedure according to an embodiment of the present invention.

Referring to FIG. 10, a user equipment (or a network) receives information on relation among a random access preamble, a random access cause, and an identifier from a network (or a user equipment) through an RRC message. The RRC message may be system information or a paging message.

The RRC layer of the user equipment informs lower layers, e.g., the MAC layer and the physical layer, of the relation information. Depending on situation, the RRC layer may inform the relation information to the MAC layer, and the MAC layer may subsequently inform the relation information to the physical layer.

In an embodiment, the random access preamble and the random access cause may be associated with the identifier. For example, as shown in the figure, it is assumed that there are 64 available random access preambles, and their indexes are respectively 0 to 63. An index of a random access preamble is also called as a signature index. Signature indexes 0 to 10 are used for initial access, and an identifier related thereto is RA-RNTI1. Signature indexes 11 to 30 are used for time synchronization, and an identifier related thereto is RA-RNTI2. Signature indexes 31 to 50 are used for radio resource request (RR), and RA-RNTI3 is used. Finally, signature indexes 51 to 63 are used for handover (HO), and RA-RNTI4 is used.

If a user equipment uses random access for handover, one of random access preambles 51 to 63 is used. Then, the user equipment monitors a PDCCH for RA-RNTI4 to receive a random access response.

In another embodiment, a index of random access preamble (also called as signature index), a random access cause, and a RACH occasion may be associated with an identifier. The RACH occasion is uplink radio resources used to transmit a random access preamble. Table 1 shows an example of correlations among the signature index, random access cause, identifier, and RACH occasion.

TABLE 1

| Signature index | RACH occasion | Cause | Identifier |
| --- | --- | --- | --- |
| 0~35 | 0 | Initial access | RA-RNTI1 |
| 36~63 | 0 | Time Sync. | RA-RNTI2 |
| 0~23 | 1 | RR | RA-RNTI3 |
| 24~63 | 1 | HO | RA-RNTI4 |

Signature indexes 0 to 35 and RACH occasion 0 are used for initial access, and an identifier related thereto is RA-RNTI1. Signature indexes 36 to 63 and RACH occasion 0 are used for time synchronization, and an identifier related thereto is RA-RNTI2. Signature indexes 0 to 23 and RACH occasion 1 are used for radio resource request (RR), and RA-RNTI3 is used. Signature indexes 24 to 63 and RACH occasion 1 are used for handover (HO), and RA-RNTI4 is used. If the RACH occasions are used in addition to the RACH signatures, the number of available RACH signatures is increased, and thus capacity of a cell may be increased.

Figure 11:
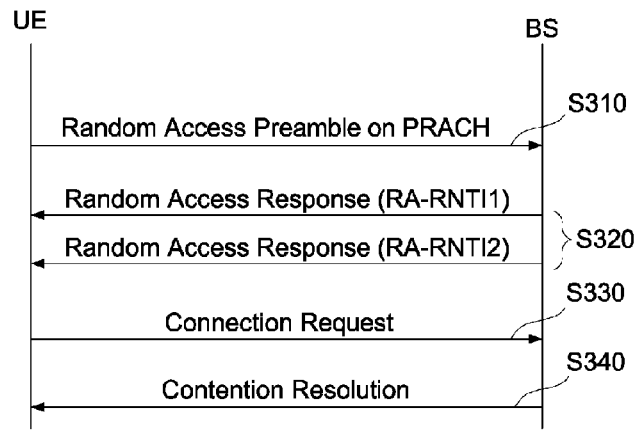
FIG. 11 is a flowchart illustrating a random access procedure according to another embodiment of the present invention.

FIG. 11 is a flowchart illustrating a random access procedure according to another embodiment of the present invention.

Referring to FIG. 11, a user equipment selects a dedicated random access preamble and/or PRACH resources based on information contained in system information or a paging message received from a base station and transmits the selected random access preamble to the base station at step 310.

Random access responses are classified based on the dedicated random access preamble or PRACH resources. For example, it is assumed that when performing handover, the user equipment uses a dedicated random access preamble previously allocated by the base station. After receiving a random access preamble transmitted from the user equipment, the base station may determine whether the user equipment is to perform handover by confirming the dedicated random access preamble. The base station classifies an identifier as RA-RNTI1 for handover and RA-RNTI2 for other than handover. The base station generates a random access response based on the identifier and transmits the random access response to a user equipment.

After receiving the preamble, the base station determines the cause of the random access based on the random access preamble or PRACH resources selected by the user equipment and transmits a corresponding random access response together with a corresponding RA-RNTI at step S320. For example, the base station determines whether the random access preamble or the PRACH resources are dedicated to handover and classifies a random access response based on the determination. For example, the base station transmits a random access response together with RA-RNTI1 to a user equipment trying handover and a random access response together with RA-RNTI2 to a user equipment trying other than handover.

After receiving the random access response, the user equipment transmits a connection request message based on radio resource allocation information contained in the random access response at step S330. The user equipment monitors a PDCCH for the RA-RNTI based on the cause of the random access and reads a random access response on a corresponding DL-SCH. The user equipment transmits a connection request message based on the information contained in the random access response. For example, if the user equipment has transmitted the random access preamble for the purpose of handover, the user equipment reads a random access response on a DL-SCH addressed by RA-RNTI1 on the PDCCH. On the other hand, if the user equipment has transmitted the random access preamble for the purpose of other than handover, the user equipment reads a random access response on a DL-SCH addressed by the RA-RNTI2 on the PDCCH. The user equipment receives the random access response on the PDCCH monitored in each TTI.

After receiving the connection request message, the base station transmits a contention resolution message to the user equipment at step S340.

Figure 12:
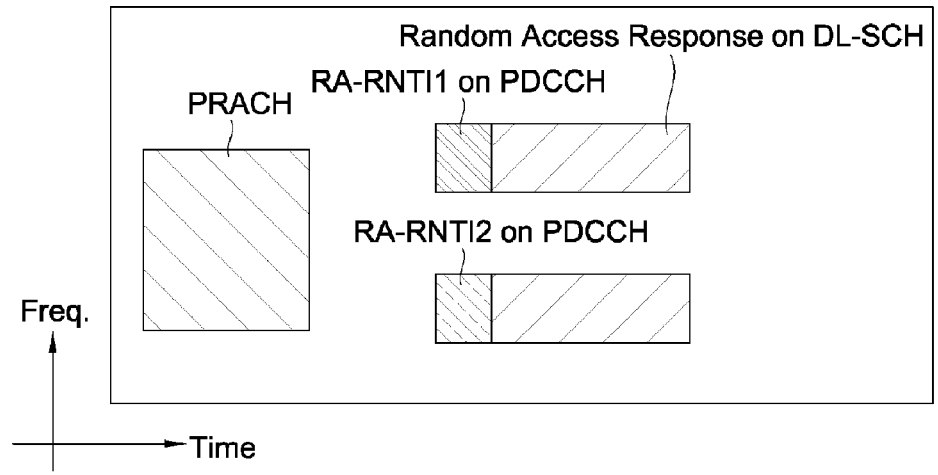
FIG. 12 is a view showing an example of a method of transferring the random access response of FIG. 11.

FIG. 12 is a view showing an example of a method of transferring the random access response of FIG. 11.

Referring to FIG. 12, a user equipment transmits a random access request to a base station through a PRACH. The base station transmits RA-RNTI1 or RA-RNTI2 to the user equipment through a PDCCH based on the dedicated random access preamble. Different RA-RNTIs and random access responses corresponding respective RA-RNTIs are transmitted through FDD (Frequency Division Duplex).

Figure 13:
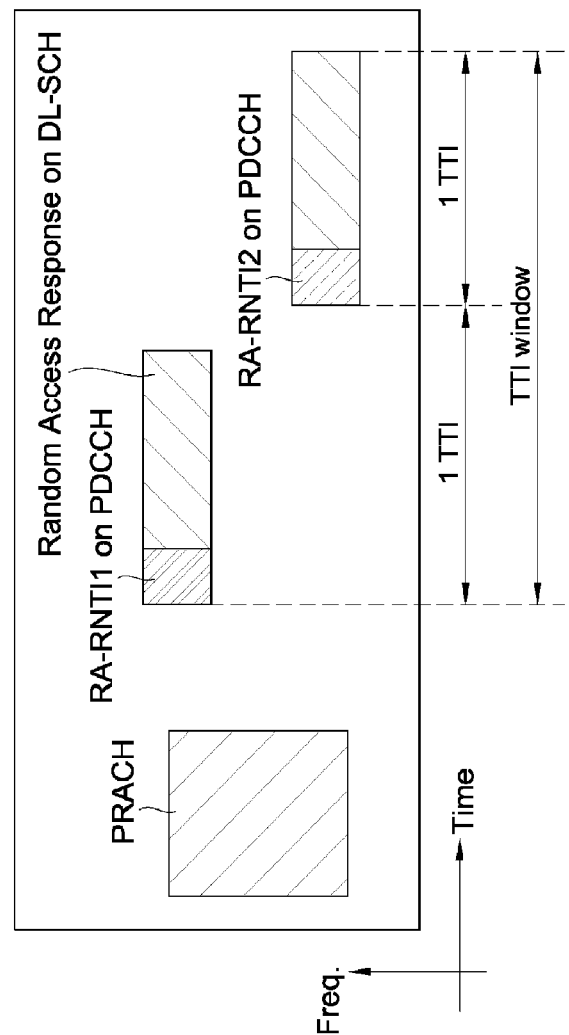
FIG. 13 is a view showing another example of a method of transferring the random access response of FIG. 11.

FIG. 13 is a view showing another example of a method of transferring the random access response of FIG. 11.

Referring to FIG. 13, a user equipment transmits a random access request to a base station through a PRACH. The base station transmits RA-RNTI1 or RA-RNTI2 through a PDCCH based on a dedicated RACH signature and a corresponding random access response through a DL-SCH. Random access responses having different RA-RNTIs are transmitted through TDD (Time Division Duplex). That is, the DL-SCH and PDCCH for transmitting RA-RNTIs are divided in time to sequentially transmit respective random access responses. The user equipment searches a random access response during a TTI window. If the user equipment receives its random access response, it stops monitoring. Therefore, power consumption of the user equipment caused by continuously monitoring the PDCCH during the TTI window can be reduced.

Figure 14:
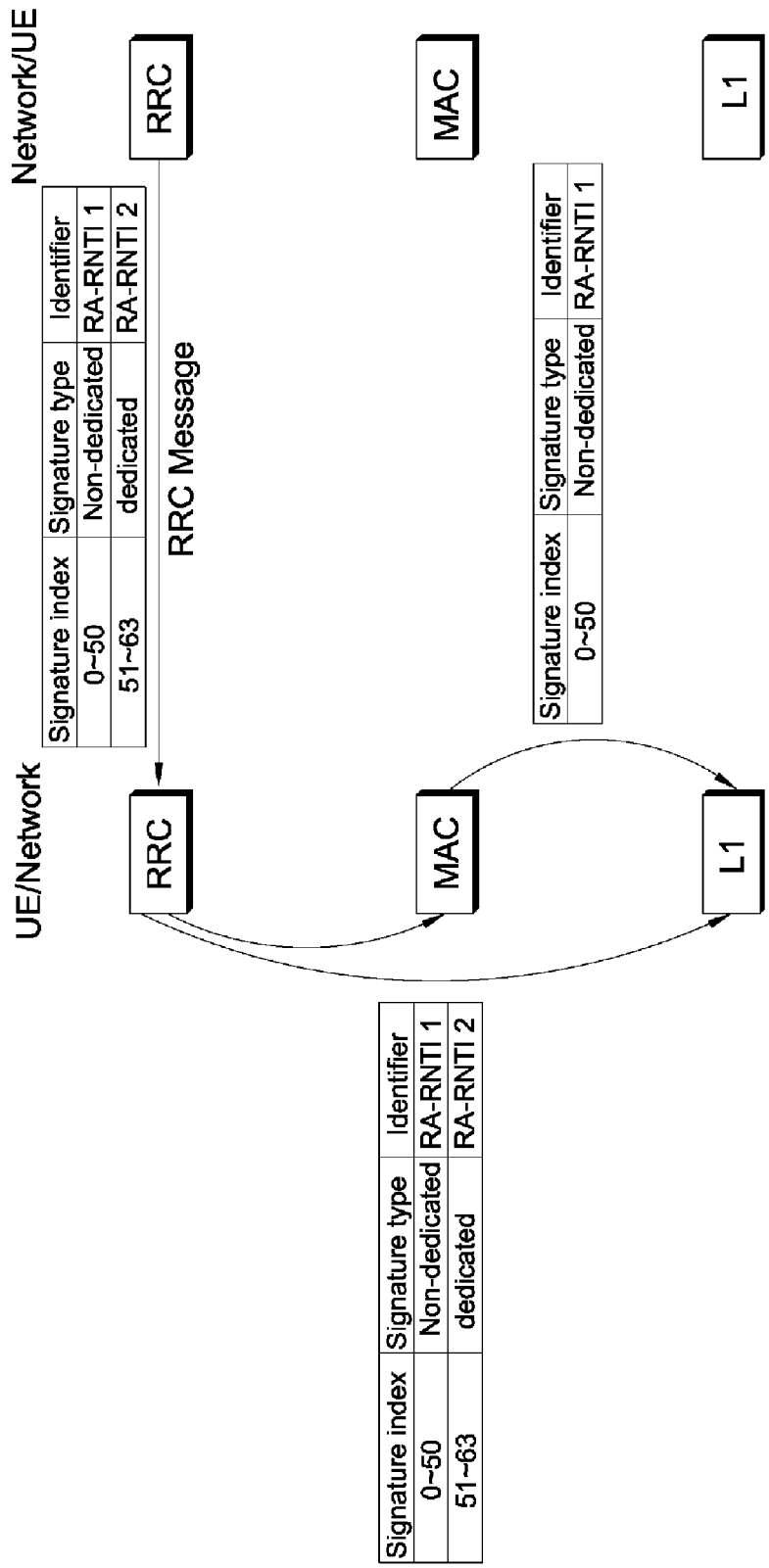
FIG. 14 is a block diagram showing a random access procedure according to another embodiment of the present invention.

FIG. 14 is a block diagram showing a random access procedure according to another embodiment of the present invention.

Referring to FIG. 14, a user equipment (or a network) receives information on relation among a random access preamble, a type of the random access preamble, and an identifier from a network (or a user equipment) through an RRC message. The RRC message may be system information or a paging message.

The RRC layer of the user equipment informs lower layers, e.g., the MAC layer and the physical layer, of the relation information. Depending on situation, the RRC layer may inform the relation information to the MAC layer, and the MAC layer may subsequently inform the relation information to the physical layer.

As shown in the figure, it is assumed that there are 64 available random access preambles, and their indexes (signature indexes) are respectively 0 to 63. Signature indexes 0 to 50 are used as undedicated signatures, and an identifier related thereto is RA-RNTI1. Signature indexes 51 to 63 are used as signatures dedicated to a specific cause, and an identifier related thereto is RA-RNTI2.

When one of signature indexes 51 to 63 is used, the user equipment monitors a PDCCH for RA-RNTI2 to receive a random access response. When one of signature indexes 0 to 50 is used, the user equipment monitors for RA-RNTI1. The user equipment determines which identifier is to be used to receive a random access response based on a plurality of RA-RNTIs transmitted from the base station and random access preamble information associated with the RA-RNTIs, monitors a PDCCH for a corresponding identifier, and receives a random access response on a DL-SCH.

Figure 15:
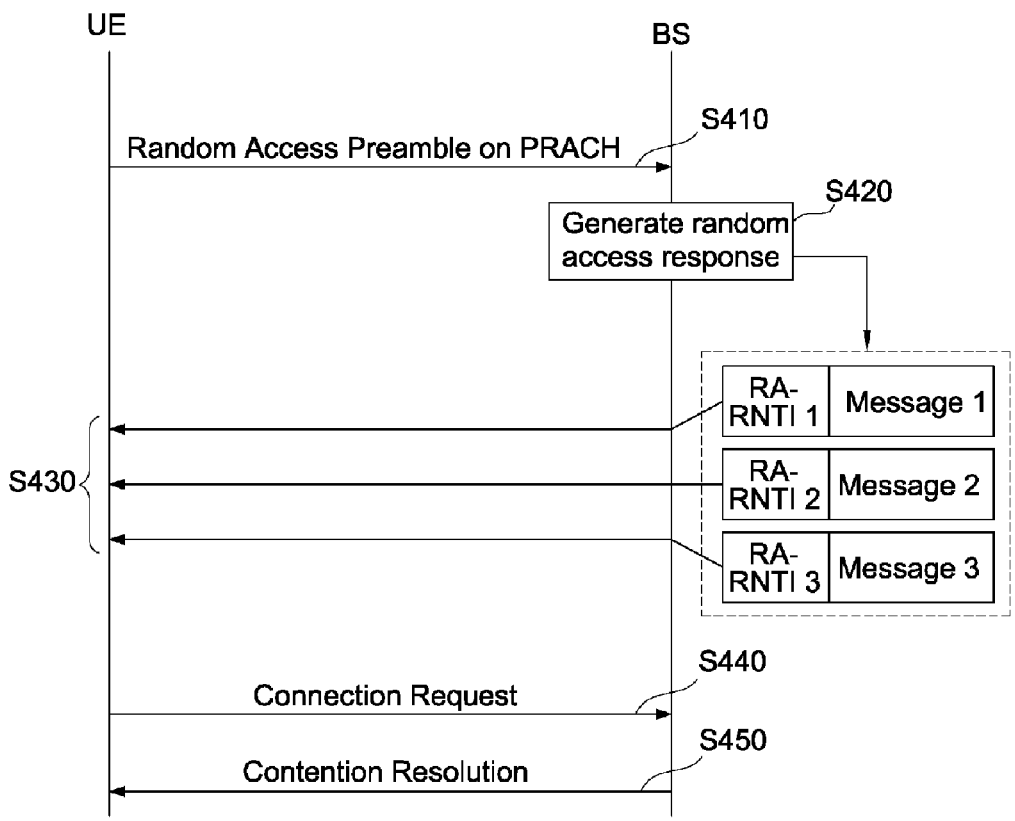
FIG. 15 is a block diagram showing a random access procedure according to still another embodiment of the present invention.

FIG. 15 is a block diagram showing a random access procedure according to still another embodiment of the present invention.

Referring to FIG. 15, a user equipment transmits a random access preamble to a base station based on information contained in system information or a paging message received from the base station at step S410.

The base station generates a random access response depending on the limit of amount of data that can be transmitted through the random access response at step S420. In configuring the random access response, the base station provides the user equipment with a plurality of identifiers, i.e., RA-RNTIs, in case for generating one or more random access responses. If there are three RA-RNTIs, RA-RNTI1, RA-RNTI2, and RA-RNTI3 are provided.

When the base station receives a plurality of random access preambles from a plurality of user equipments, the base station may configure random access responses in one message for the plurality of user equipments. If the length of a message exceeds the amount of data that can be transmitted in one random access response, the base station configures a plurality of random access responses. For example, it is assumed that the amount of data that can be contained in a random access response is 150 bits, and the amount of data of a random access response needed for one user equipment is 50 bits. If seven user equipments simultaneously perform random access at the same time point or in a specific time interval, the amount of required random access responses reaches total 350 bits. However, since the maximum transmission amount of a random access response is only 150 bits, three random access responses of 150 bits (message 1), 150 bits (message 2), and 50 bits (message 3) are configured. In this manner, a plurality of random access responses are configured, and the base station transmits the plurality of random access responses to the user equipments.

Identifiers are transmitted together with the plurality of random access responses at step S430. An identifier is allocated to each of the random access responses. The identifiers may be different in respective random access responses or the same for all random access responses. It is assumed that RA-RNTI1 is allocated to message 1, RA-RNTI2 is allocated to message 2, and RA-RNTI3 is allocated to message 3. RA-RNTI1 is transmitted through a PDCCH together with message 1 transmitted through a DL-SCH, RA-RNTI2 is transmitted through the PDCCH together with message 2 transmitted through the DL-SCH, and RA-RNTI3 is transmitted through the PDCCH together with message 3 transmitted through the DL-SCH.

After receiving the random access response, the user equipment transmits a connection request message based on radio resource allocation information contained in the random access response at step S440. After transmitting the random access preamble to the base station, the user equipment monitors the PDCCH for RA-RNTI. If three RA-RNTIs are set by the base station, the user equipment monitors for all the three RA-RNTIs. For example, it is assumed that RA-RNTI1 is associated with message 1 on the DL-SCH, RA-RNTI2 is associated with message 2, and RA-RNTI3 is associated with message 3. If the user equipment receives all the RA-RNTI1, RA-RNTI2, and RA-RNTI3 on the PDCCH, the user equipment first confirms message 1 associated with RA-RNTI1. By confirming message 1, the user equipment confirms whether there is a random access response transmitted to the user equipment. The user equipment may confirm its random access response by determining whether the random access response contains a random access preamble identifier corresponding to the random access preamble transmitted by the user equipment. For example, if there are 64 random access preambles, an index value can be expressed with 6 bits. That is, if a random access preamble having an index value of '000010' is used, a random access response transmitted from the base station contains the index value '000010' to identify a user equipment to which the random access response is transmitted. The user equipment determines whether there is a random access response transmitted to the user equipment by confirming contents of message 1 associated with RA-RNTI1. If there is no random access response transmitted to the user equipment, the user equipment confirms message 2 associated with RA-RNTI2. If there is no random access response transmitted to the user equipment in message 2, the user equipment confirms message 3 associated with RA-RNTI3 in the same manner. If the user equipment identifies a random access response transmitted to the user equipment in message 1 associated with RA-RNTI1, the user equipment may not confirm messages 2 and 3 associated with RA-RNTI2 and RA-RNTI3.

After receiving the connection request message from the user equipment, the base station transmits a contention resolution message to the user equipment at step S450.

When a lot of user equipments simultaneously try random access at a specific time point, the amount of data to be transmitted through a random access response will be increased, and the base station may need to divide and transmit the random access response. The base station uses as many RA-RNTIs as the number of random access responses divided depending on the limit of amount of data that can be transmitted through a random access response. The base station does not transmit one RA-RNTI to the user equipment, but informs the user equipment of a set containing a plurality of RA-RNTIs. When a plurality of user equipments performs random access, the base station may transmit a random access response to all the user equipment regardless of the maximum transmission amount of a random access response.

Figure 16:
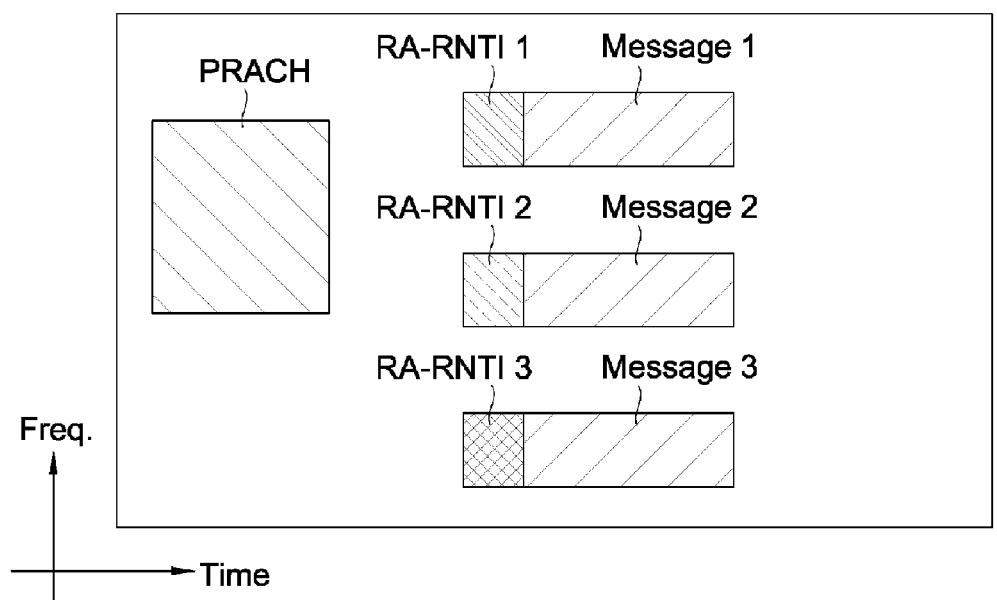
FIG. 16 is a view showing an example of a method of transferring a random access response.

FIG. 16 is a view showing an example of a method of transferring a random access response.

Referring to FIG. 16, a user equipment transmits a random access request to a base station through a PRACH. The base station configures three random access responses of message 1, message 2, and message 3 depending on the maximum transmission amount of a random access response, and different RA-RNTIs are allocated to different messages. It is assumed that RA-RNTI1 is associated with message 1 on a DL-SCH, RA-RNTI2 is to message 2, and RA-RNTI3 is to message 3. RA-RNTI1 is transmitted through a PDCCH together with message 1 transmitted through a DL-SCH, RA-RNTI2 is transmitted through the PDCCH together with message 2 transmitted through the DL-SCH, and RA-RNTI3 is transmitted through the PDCCH together with message 3 transmitted through the DL-SCH. Different RA-RNTIs are transmitted in FDD, and different messages 1, 2, and 3 are transmitted also in FDD.

Figure 17:
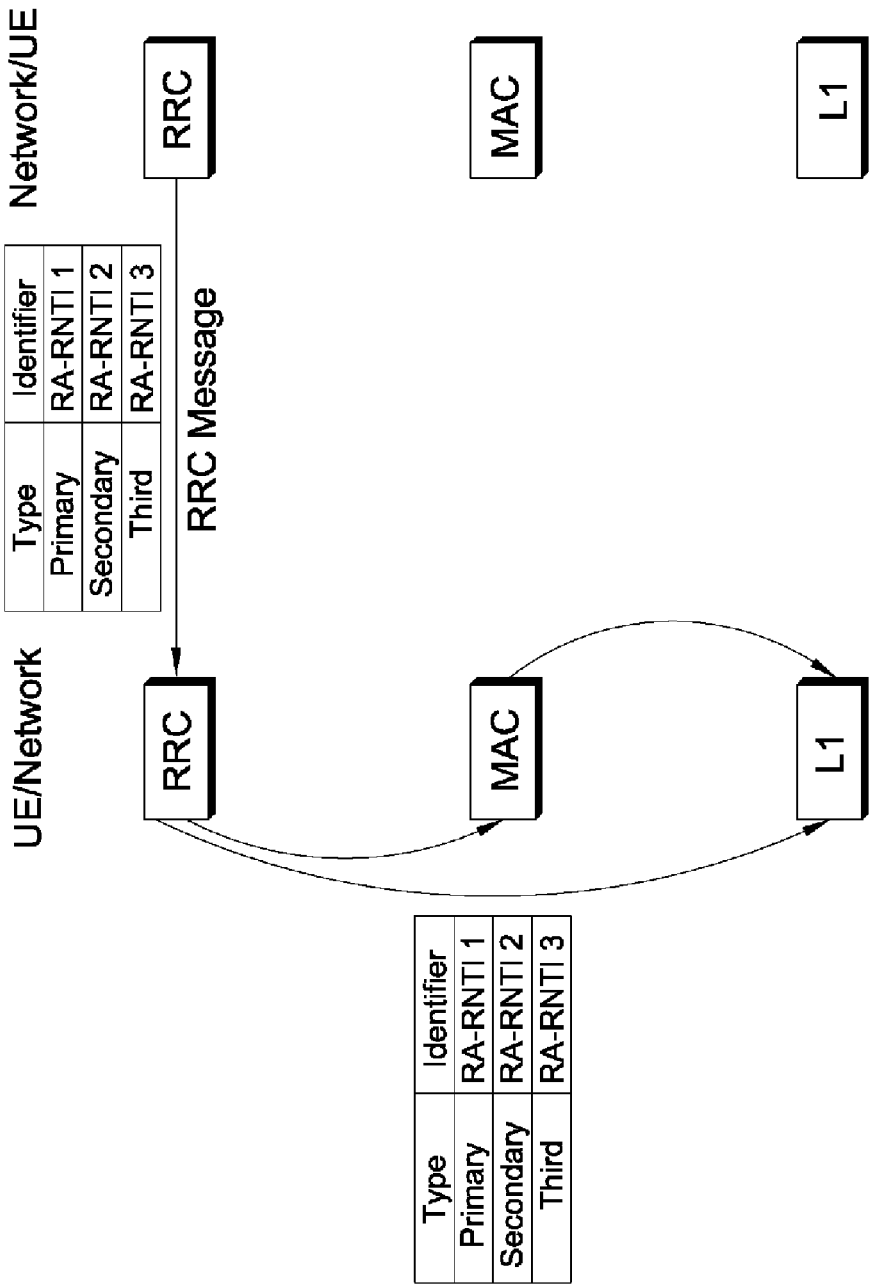
FIG. 17 is a block diagram showing a random access procedure using the transfer method of FIG. 16.

FIG. 17 is a block diagram showing a random access procedure using the transfer method of FIG. 16.

Referring to FIG. 17, a user equipment (or a network) receives information on a plurality of RA-RNTIs from a network (or a user equipment) through an RRC message. The RRC message may be system information or a paging message. For example, the network may inform the user equipment of a set of RA-RNTIs containing three RA-RNTIs. In the RA-RNTI set, RA-RNTI1 is used as a primary priority, RA-RNTI2 is used as a secondary priority, RA-RNTI3 is used as a tertiary priority. The RRC layer of the user equipment transfers the information on the plurality of RA-RNTIs to lower layers, such as the MAC layer and the physical layer.

The user equipment maintains contents of the RA-RNTI set to receive a random access response based on the RA-RNTI set after transmitting a random access preamble to the network for random access. Based on the RA-RNTI set, the user equipment monitors all of the three RA-RNTIs on the PDCCH.

If RA-RNTI1, RA-RNTI2, RA-RNTI3 are transmitted through the PDCCH, the user equipment receives and stores three DL-SCH messages corresponding to the RA-RNTIs. It is assumed that a message associated with RA-RNTI1 is message 1, a message associated with RA-RNTI2 is message 2, and a message associated with RA-RNTI3 is message 3. The user equipment first confirms where its random access response is contained in message 1 by decoding message 1. If its random access response is contained in message 1, the user equipment deletes messages 2 and 3 from the buffer without decoding them and transmits a connection request message to the network. If its random access response is not contained in message 1, the user equipment determines whether its random access response is contained in the next message 2. If its random access response is contained in message 2, the user equipment deletes message 3 from the buffer without decoding it and transmits a connection request message to the network. If its random access response is not contained in message 2, the user equipment determines whether its random access response is contained in the next message 3. If its random access response is contained in message 3, the user equipment transmits a connection request message to the network. If all of messages 1, 2, and 3 do not contain a random access response transferred to the user equipment, the user equipment performs random access.

Figure 18:
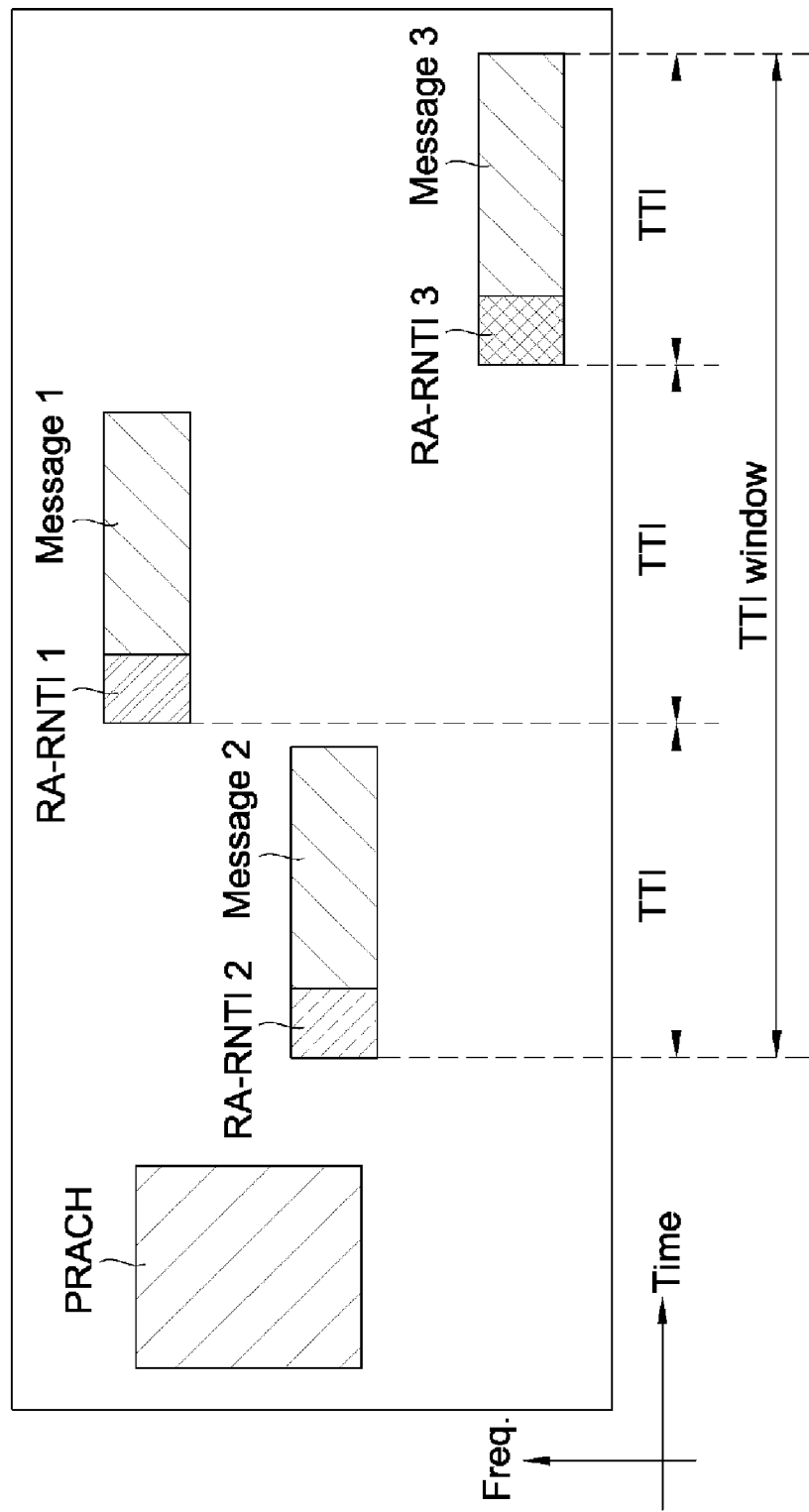
FIG. 18 is a view showing another example of a method of transferring a random access response.

FIG. 18 is a view showing another example of a method of transferring a random access response.

Referring to FIG. 18, a user equipment transmits a random access request to a base station through a PRACH. It is assumed that three random access responses of message 1, message 2, and message 3 are configured depending on the maximum transmission amount of a random access response. Each message is transmitted in TDD (Time Division Duplex). That is, message 1 is transmitted first, and messages 2 and 3 are sequentially transmitted. An RA-RNTI is transmitted together with each of messages 1, 2, and 3 through the PDCCH. A message associated with RA-RNTI1 is referred to as message 1, a message associated with RA-RNTI2 is referred to as message 2, and message associated with RA-RNTI3 is referred to as message 3.

After transmitting a random access preamble to the base station, the user equipment monitors the PDCCH for an RA-RNTI. If the user equipment initially receives RA-RNTI1 on the PDCCH, the user equipment confirms corresponding message 1. By confirming message 1, the user equipment confirms whether there is a random access response transmitted to the user equipment. The user equipment may confirm its random access response by determining whether the random access response contains a random access preamble identifier corresponding to the random access preamble transmitted by the user equipment. The user equipment confirms contents of message 1 to determine whether message 1 is a random access response transmitted to the user equipment. If message 1 is a random access response transmitted to the user equipment, the user equipment stops receiving random access responses. If message 1 is not a random access response transmitted to the user equipment, the user equipment monitors the PDCCH for RA-RNTI2 in the next TTI and confirms message 2. If message 2 is a random access response transmitted to the user equipment, the user equipment stops receiving random access responses. If message 2 is not a random access response transmitted to the user equipment, the user equipment monitors the PDCCH for RA-RNTI3 in the next TTI and confirms message 3. If the user equipment identifies a random access response transmitted to the user equipment in message 1 associated with the initially received RA-RNTI1, the user equipment does not monitor the PDCCH thereafter, and thus power consumption of the user equipment may be reduced.

On the other hand, when random access responses are transmitted in TDD, only one RA-RNTI may be used. That is, RA-RNTI is transmitted through the PDCCH together with message 1 transmitted through the DL-SCH, subsequently, RA-RNTI is transmitted through the PDCCH together with message 2 transmitted through the DL-SCH, and finally, RA-RNTI is transmitted through the PDCCH together with message 3 transmitted through the DL-SCH. Since a plurality of random access responses are transmitted at time intervals, random access responses may be identified with only one RA-RNTI.

Figure 19:
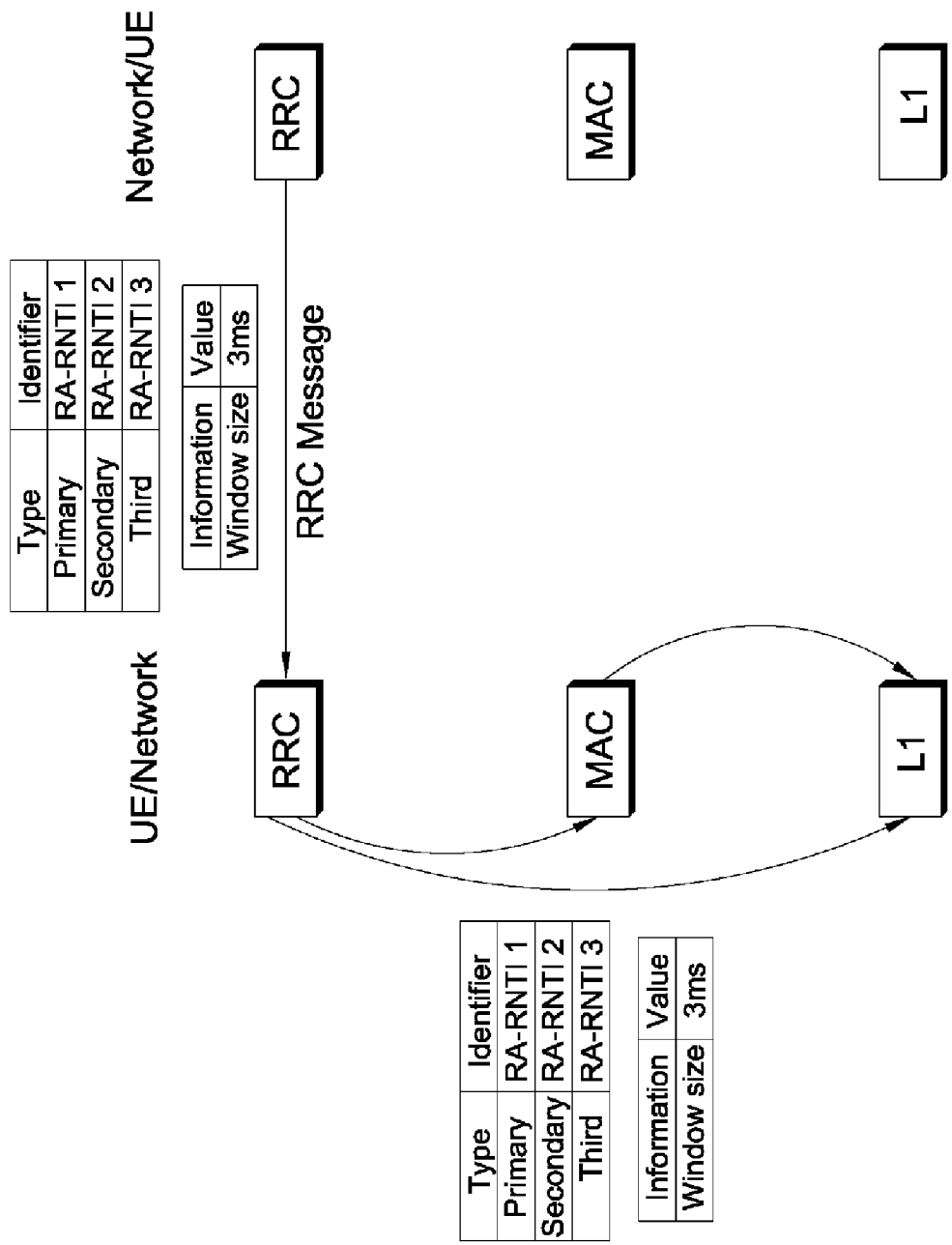
FIG. 19 is a block diagram showing a random access procedure using the transfer method of FIG. 18.

FIG. 19 is a block diagram showing a random access procedure using the transfer method of FIG. 18.

Referring to FIG. 19, a user equipment (or a network) receives information on a plurality of RA-RNTIs from a network (or a user equipment) through an RRC message. The RRC message may be system information or a paging message. For example, the network may inform the user equipment of a set of RA-RNTIs containing three RA-RNTIs. In the RA-RNTI set, RA-RNTI1 is used as a primary priority, RA-RNTI2 is used as a secondary priority, RA-RNTI3 is used as a tertiary priority. In addition, the RRC message contains information on parameters for deriving a TTI window. The TTI window is a maximum time interval of a user equipment between transmitting a random access preamble and receiving a random access response. Here, the TTI window is expressed as a window size. For example, if the TTI window size is 3 ms and a random access response is not received within 3 ms after a random access preamble is transmitted, the user equipment determines that random access is failed and performs random access again. The RRC layer of the user equipment transfers the information on the plurality of RA-RNTIs to lower layers, such as the MAC layer and the physical layer.

The user equipment maintains contents of the RA-RNTI set to receive a random access response based on the RA-RNTI set after transmitting a random access preamble to the network for random access. RA-RNTI1, RA-RNTI1, and RA-RNTI1 are sequentially transmitted within the window size for transferring a random access response. After transmitting a random access preamble, the user equipment monitors the PDCCH for RA-RNTI1. After monitoring for RA-RNTI1, the user equipment determines whether its random access response is contained in a message transmitted through the DL-SCH. If its random access response is contained in the message, the user equipment transmits a connection request message. If its random access response is not contained in the message, the user equipment monitors the PDCCH for RA-RNTI2. After monitoring for RA-RNTI2, the user equipment determines whether its random access response is contained in a message transmitted through the DL-SCH. If its random access response is contained in the message, the user equipment transmits a connection request message. If its random access response is not contained in the message, the user equipment monitors for RA-RNTI3 and performs the process described above in the same manner.

Figure 20:
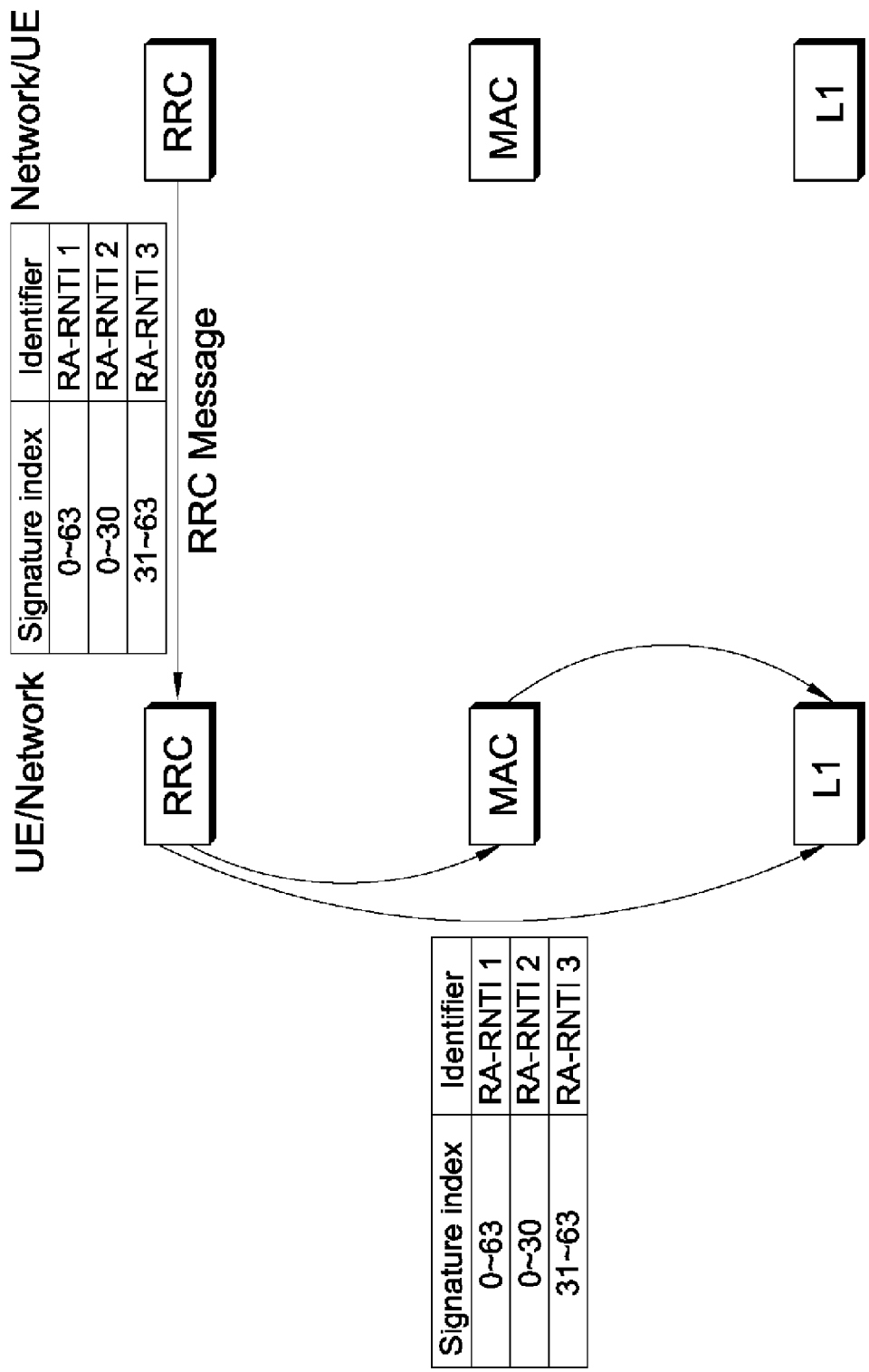
FIG. 20 is a block diagram showing a random access procedure according to still another embodiment of the present invention.

FIG. 20 is a block diagram showing a random access procedure according to still another embodiment of the present invention. In this embodiment, a common RA-RNTI is used when one random access response is transmitted, whereas specific RA-RNTIs are used when a plurality of random access responses is transmitted.

Referring to FIG. 20, a user equipment receives information on a plurality of RA-RNTIs from a base station through an RRC message. The RRC message may be system information or a paging message. The base station may inform the user equipment of a set of RA-RNTIs containing three RA-RNTIs.

The mapping relation between a plurality of RA-RNTIs and signatures is as described below. It is assumed that there are 64 random access preambles, and their indexes are respectively 0 to 63. First, RA-RNTI1 is associated with all of the 64 random access preamble. RA-RNTI2 is associated with random access preambles 0 to 30, and RA-RNTI3 is associated with random access preambles 31 to 63. That is, the base station first determines whether to transmit one random access response or a plurality of divided random access responses depending on the number of user equipments performing random access. If one random access response is transmitted, the base station transmits RA-RNTI1 through the PDCCH to transmit a random access response. If a plurality of random access responses is transmitted, the base station configures random access responses for respective signature groups and transmits the random access responses to the user equipment. That is, the base station transmits a random access response for a user equipment that uses random access preambles 0 to 30 (hereinafter, referred to as message A) and a random access response for a user equipment that uses random access preambles 31 to 63 (hereinafter, referred to as message B). RA-RNTI2 is transmitted through the PDCCH when message A is transmitted through the DL-SCH, and RA-RNTI3 is transmitted through the PDCCH when message B is transmitted through the DL-SCH.

The user equipment maintains contents of the RA-RNTI set to receive a random access response based on the RA-RNTI set after transmitting a random access preamble to the network for random access. Based on the RA-RNTI set, the user equipment monitors the PDCCH for two types of RA-RNTIs. Here, the two types of RA-RNTIs are RA-RNTI1 associated with all signatures and the RA-RNTI of a group containing a signature that has been used when the user equipment transmits a random access preamble. For example, if a random access preamble 40 has been used, the user equipment monitors for RA-RNTI1 and RA-RNTI3. Or, if a random access preamble 2 has been used, the user equipment monitors for RA-RNTI1 and RA-RNTI2. The user equipment monitors for two types of RA-RNTIs in this manner and receives a random access response if either of the two types of RA-RNTIs is on the PDCCH.

Figure 21:
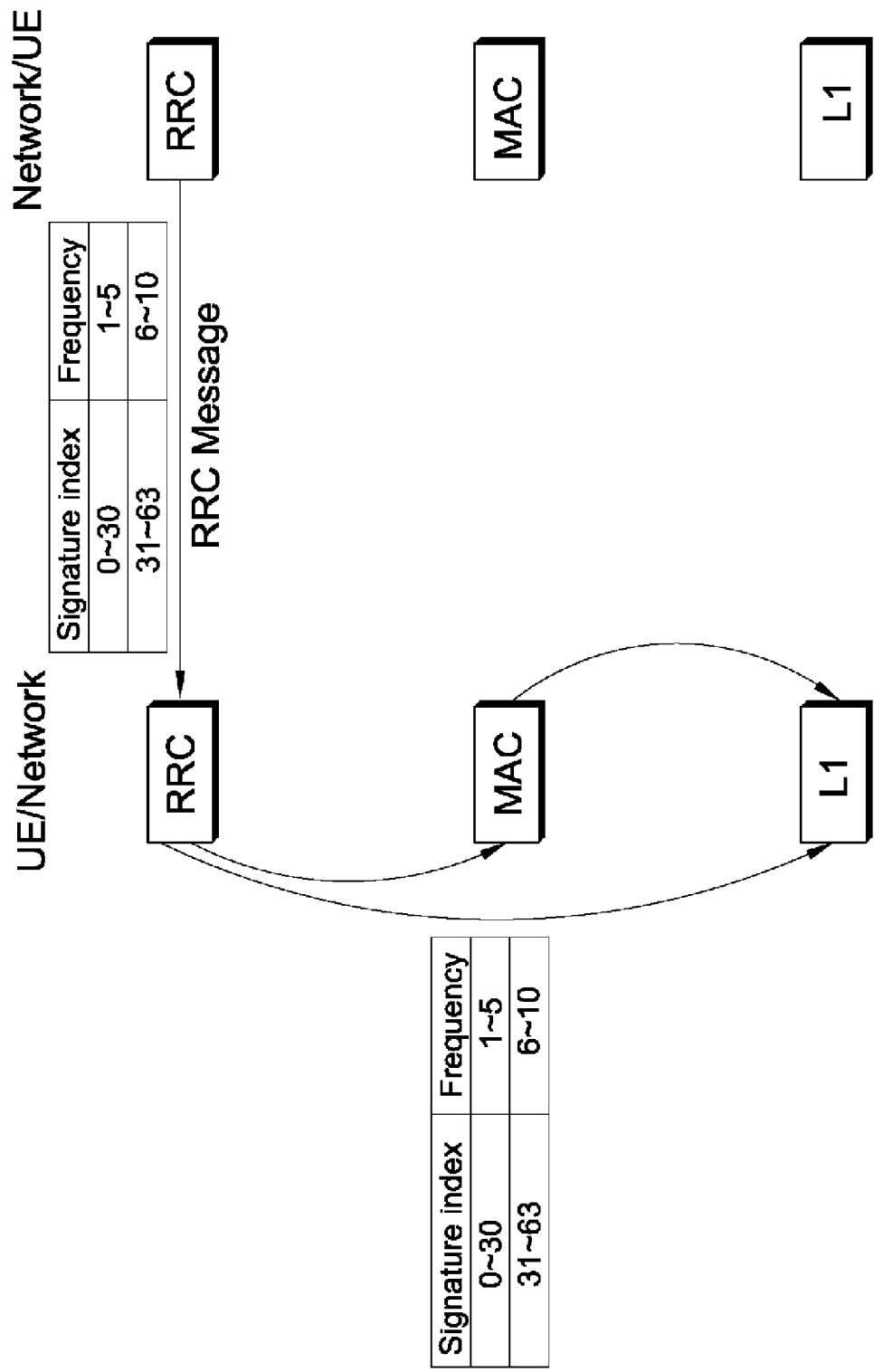
FIG. 21 is a block diagram showing a random access procedure according to still another embodiment of the present invention.

FIG. 21 is a block diagram showing a random access procedure according to still another embodiment of the present invention. According to the figure, a user equipment reads a specific portion of a specific PDCCH depending on a signature in order to transmit a plurality of random access responses.

Referring to FIG. 21, a user equipment (or a network) receives information on a plurality of RA-RNTIs from a network (or a user equipment) through an RRC message. The RRC message may be system information or a paging message. For example, the base station may inform the user equipment of a set of RA-RNTIs containing two RA-RNTIs.

The mapping relation between a plurality of RA-RNTIs and random access preambles is as described below. It is assumed that frequencies at which the user equipment should read a PDCCH to receive a random access response after transmitting a random access preamble are 1 to 10. If only one RA-RNTI is used, the user equipment monitors all of the frequencies 1 to 10 to confirm whether there is an RA-RNTI. However, frequencies at which the user equipment reads the PDCCH are divided for each group of signatures. For example, a user equipment that uses signature 0 to 30 reads frequencies 1 to 5 to confirm an RA-RNTI, and a user equipment that uses signatures 31 to 63 reads frequencies 6 to 10 to confirm an RA-RNTI.

The user equipment maintains contents of the RA-RNTI set to receive a random access response based on the RA-RNTI set after transmitting a random access preamble to the network for random access. Based on the RA-RNTI set, the user equipment determines at which frequency the PDCCH is read. For example, if a user equipment uses signature 2, the user equipment reads frequency channels 1 to 5 of the PDCCH to receive a random access response. If a user equipment uses signature 50, the user equipment reads frequency channels 6 to 10 of the PDCCH to receive a random access response.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for improving user equipment (UE) power consumption during a random access procedure in a wireless communication system, the method comprising:
   receiving, from a base station (BS), a plurality of available random access preambles having associated random access request causes;
   selecting one random access preamble among the plurality of available random access preambles, which is associated with a first cause of the associated random access request causes for a UE requesting random access to the wireless communication system;
   transmitting the selected random access preamble to the BS as a network action request that is associated with the first cause, wherein the transmitted random access preamble includes an identifier for identifying a random access radio network temporary identity (RA-RNTI) to be included in a random access response;
   receiving, from the BS, a plurality of random access responses;
   determining if any of the received random access responses includes the same identified RA-RNTI transmitted to the BS by the UE;
   entering the UE into a power-saving mode only when the received random access response includes the same identified RA-RNTI; and
   transmitting a new random access preamble only when all of the received random access responses do not include the same identified RA-RNTI.

2. The method of claim 1, further comprising receiving, from the BS, the plurality of available random access preambles having associated random access request causes, via a radio resource control (RRC) message.

3. The method of claim 1, wherein the first cause of the UE requesting random access is associated with one of an initial access, a handover, a scheduling request, and a time synchronization.

4. The method of claim 1, wherein the plurality of available random access preambles are classified into at least two groups based on their associated random access request causes, and wherein the selected random access preamble is selected from one of the at least two groups.

5. The method of claim 4, wherein the selected random access preamble is randomly selected from the one of the at least two groups.

6. The method of claim 1, wherein the random access response is one of a plurality of random access responses which are transmitted at different frequencies.

7. The method of claim 1, wherein the random access response is one of a plurality of random access responses which are transmitted at different times.

8. A wireless device comprising:
   a Radio Frequency (RF) unit configured to transmit radio signals; and
   a processor coupled to the RF unit, wherein the wireless terminal is configured to:
   receive, from a base station (BS), a plurality of available random access preambles having associated random access request causes;
   select a random access preamble among the plurality of available random access preambles, which is associated with a first cause of the associated random access request causes for a user equipment (UE) requesting random access to a wireless communication system;
   transmit the selected random access preamble to the BS as a network action request that is associated with the first cause, wherein the random access preamble includes an identifier for identifying a random access radio network temporary identity (RA-RNTI) to be included in a random access response;
   receive, from the BS, a plurality of random access responses;
   determine if any of the received random access responses includes the same identified RA-RNTI transmitted to the BS by the UE;
   enter the UE into a power-saving mode only when the received random access response includes the same identified RA-RNTI; and
   transmit a new random access preamble only when all of the received random access responses do not include the same identified RA-RNTI.

9. The wireless device of claim 8, which is further configured to receive, from the BS, the plurality of available random access preambles having associated random access request causes, via a radio resource control (RRC) message.

10. The wireless device of claim 8, wherein the plurality of available random access preambles are classified into at least two groups based on their associated random access request causes, and wherein the selected random access preamble is selected from one of the at least two groups.

11. A method for improving user equipment (UE) power consumption during a random access procedure in a wireless communication system, the method comprising:
   transmitting, from a base station to the UE, a plurality of available random access preambles having associated random access request causes;
   receiving, by the BS, a random access preamble from the UE as a network action request, the random access preamble having been selected among the plurality of available random access preambles having associated random access request causes, based on a first cause of the UE requesting random access to the wireless communication system, wherein the received random access preamble includes an identifier for identifying a random access radio network temporary identity (RA-RNTI) to be included in a random access response;
   transmitting, from the BS to the UE, a plurality of random access responses, in response to the received random access preamble;
   determining if any of the received random access responses includes the same identified RA-RNTI transmitted to the BS by the UE;
   entering the UE into a power-saving mode only when the received random access response includes the same identified RA-RNTI; and
   transmitting a new random access preamble only when all of the received random access responses do not include the same identified RA-RNTI.

12. The method of claim 11, further comprising transmitting the plurality of available random access preambles having associated random access request causes to the UE via a radio resource control (RRC) message.

13. The method of claim 11, wherein the first cause of the UE requesting random access is associated with one of an initial access, a handover, a scheduling request, and a time synchronization.

14. The method of claim 11, wherein the plurality of available random access preambles are classified into at least two groups based on their associated random access request causes, and wherein the received random access preamble is selected from one of the at least two groups.

15. The method of claim 14, wherein the received random access preamble is randomly selected from the one of the at least two groups by the UE.

16. The method of claim 11, wherein the random access response is one of a plurality of random access responses which are transmitted at different frequencies.

17. The method of claim 11, wherein the random access response is one of a plurality of random access responses which are transmitted at different times.

* * * * *